US009824132B2

(12) United States Patent
Kulkarni et al.

(10) Patent No.: US 9,824,132 B2
(45) Date of Patent: Nov. 21, 2017

(54) DATA RECOVERY IN MULTI-LEADER DISTRIBUTED SYSTEMS

(71) Applicant: Facebook, Inc., Menlo Park, CA (US)

(72) Inventors: Sachin Kulkarni, Sunnyvale, CA (US); Sanjeev Kumar, San Jose, CA (US); Harry Li, Palo Alto, CA (US); Laurent Demailly, Belmont, CA (US); Liat Atsmon Guz, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 372 days.

(21) Appl. No.: 13/736,861

(22) Filed: Jan. 8, 2013

(65) Prior Publication Data

US 2014/0195486 A1    Jul. 10, 2014

(51) Int. Cl.
| G06F 7/00 | (2006.01) |
| G06F 17/00 | (2006.01) |
| G06F 17/30 | (2006.01) |
| G06F 11/20 | (2006.01) |
| G06F 11/16 | (2006.01) |

(52) U.S. Cl.
CPC .... *G06F 17/30581* (2013.01); *G06F 11/2082* (2013.01); *G06F 11/2094* (2013.01); *G06F 11/1662* (2013.01)

(58) Field of Classification Search
None
See application file for complete search history.

(56) References Cited

U.S. PATENT DOCUMENTS

| 5,806,074 A * | 9/1998 | Souder et al. | |
| 5,806,075 A * | 9/1998 | Jain et al. | |
| 6,085,401 A * | 7/2000 | Dunning | 29/281.5 |
| 2004/0103138 A1* | 5/2004 | Lamport et al. | 709/201 |
| 2004/0117377 A1* | 6/2004 | Moser et al. | 707/10 |
| 2005/0114285 A1* | 5/2005 | Cincotta | 707/1 |
| 2005/0203993 A1* | 9/2005 | Grobman | H04L 61/1552 709/203 |
| 2005/0278346 A1* | 12/2005 | Shang et al. | 707/100 |
| 2006/0155945 A1* | 7/2006 | McGarvey | 711/162 |
| 2007/0220059 A1* | 9/2007 | Lu | G06F 17/30368 |
| 2008/0195759 A1* | 8/2008 | Novik et al. | 709/248 |
| 2008/0222159 A1* | 9/2008 | Aranha | G06F 17/30289 |
| 2010/0114826 A1* | 5/2010 | Voutilainen | G06F 11/1425 707/638 |
| 2010/0268902 A1* | 10/2010 | Drobychev et al. | 711/156 |

(Continued)

*Primary Examiner* — David T Brooks
(74) *Attorney, Agent, or Firm* — Perkins Coie LLP

(57) ABSTRACT

Disclosed are a method and system for recovering a distributed system from a failure of a data storage unit. The distributed system includes a plurality of computer systems, each having a read-write computer and a data storage unit. Data is replicated from a particular data storage unit to other data storage units using publish-subscribe model. A read-write computer receives the replicated data, processes the data for any conflicts and stores it in the data storage unit. If a data storage unit fails, another data storage unit that has latest data corresponding to the failed data storage unit is determined and the latest data is replicated to other data storage units. Accordingly, the distributed system continues to have the data of the failed data storage unit. The failed data storage unit may be reconstructed using data from one of the other data storage units in the distributed system.

18 Claims, 11 Drawing Sheets

(56) References Cited

U.S. PATENT DOCUMENTS

| | | | |
|---|---|---|---|
| 2011/0178985 A1* | 7/2011 | San Martin Arribas | G06F 17/30584 707/636 |
| 2012/0016849 A1* | 1/2012 | Garrod et al. | 707/695 |
| 2012/0023362 A1* | 1/2012 | Kadhe | G06F 3/06 714/6.3 |
| 2012/0042196 A1* | 2/2012 | Aron et al. | 714/4.11 |
| 2012/0054533 A1* | 3/2012 | Shi et al. | 714/4.1 |
| 2012/0166390 A1* | 6/2012 | Merriman | G06F 17/30578 707/613 |
| 2012/0259894 A1* | 10/2012 | Varley et al. | 707/795 |
| 2013/0054526 A1* | 2/2013 | Di Vincenzo | 707/634 |
| 2013/0067025 A1* | 3/2013 | Vasters | 709/217 |
| 2013/0198368 A1* | 8/2013 | Patterson | H04L 67/101 709/224 |
| 2013/0254590 A1* | 9/2013 | Chercoles Sanchez | G06F 17/30584 714/6.1 |
| 2013/0282656 A1* | 10/2013 | O'Neill et al. | 707/622 |

\* cited by examiner

| West | Oregon | East | Comments |
|---|---|---|---|
| ("data-west", v1, 10, W) | | | First ADD in West |
| | ("data-west", v1, 10, W) | ("data-west", v1, 10, W) | ADD in West gets replicated to Oregon and East |
| | ("data-oregon", v2, 11, O) | | ADD(2) in Oregon but network to East and West is broken |
| | ("data-oregon", v3, 12, O) | | Another ADD(3) in Oregon. This has not yet replicated |
| | ("data-oregon", v4, 12, O) | | Another ADD(4) in Oregon. This has not yet replicated |
| | | ("data-east", v2, 14, E) | An ADD in East. Version is still 2 since it does not know about the ADDs in Oregon |
| ("data-east", v2, 14, E) | | | ADD from East gets replicated to West but not to Oregon |
| ("data-oregon", v4, 12, O) | | ("data-oregon", v4, 12, O) | Network to Oregon is repaired. So other regions start getting the replicated writes from Oregon |
| | | | The v4 data item from Oregon will win since it has larger version. |

Table 605 - Version Wins
FIG. 6A

| West | Oregon | East | Comments |
|---|---|---|---|
| ("data-west", v1, 10, W) | | | First ADD in West |
| | ("data-west", v1, 10, W) | ("data-west", v1, 10, W) | ADD in West gets replicated to Oregon and East |
| | ("data-oregon", v2, 11, O) | ("data-east", v2, 12, E) | Simultaneous ADDs in both Oregon and East |
| ("data-east", v2, 12, E) | ("data-east", v2, 12, E) | | East write wins since its timestamp is higher (Note: version is same) |

Table 610 - Timestamp Wins

*FIG. 6B*

| West | Oregon | East | Comments |
|---|---|---|---|
| ("data-west", v1, 10, W) | | | First add in West |
| | ("data-west", v1, 10, W) | ("data-west", v1, 10, W) | ADD in West gets replicated to Oregon and East |
| | ("data-west", v2, 11, O) | ("data-east", v2, 11, E) | An ADD in EAST and a DELETE in Oregon. |
| ("data-west", v2, 11, O) | | | ADD from Oregon gets replicated to West |
| ("data-east", v2, 11, E) | ("data-east", v2, 11, E) | | ADD from East gets replicated to West and Oregon and wins since East has higher priority over Oregon (Note: version and timestamp are same) |

Table 615 - Region Wins

*FIG. 6C*

DATA RECOVERY IN MULTI-LEADER DISTRIBUTED SYSTEMS

FIELD OF INVENTION

This invention generally relates to data recovery in computer related technologies. More specifically, the invention relates to data recovery in multi-leader distributed systems.

BACKGROUND

In computer related technologies, current disaster management techniques in distributed systems are naïve. Some distributed architectures have a master slave configuration, where some databases are treated as slaves and some as masters. The slave databases serve read requests from clients, but not write requests (at least not directly). The write requests are routed to master databases which may be in different locations/regions. The data may then be replicated from the master databases to the slave databases, for example, in batches.

Current architectures are slow, inefficient, and have high write latency. For example, in a master slave environment, the master and slave databases can be disparate regions, "Region A" and "Region B," respectively. The turn around time for processing a write request from "Region B" by sending to the master in "Region A" may be, for example, hundreds of milliseconds. If the user performs more things in a write request, the latency may be seconds. Further, in cases where the master and slave databases are farther apart, the latency may be more. So users would start seeing slower responses for write requests.

Current architecture is less reliable at least due to a higher percentage of failure of master databases. If the master fails, write requests from the slave region will not be supported and thus, that part of the distributed system in regions with the slave databases is unavailable. Further, such architecture results in lower availability when network to regions having master databases fails. The current architecture may be suitable for environments that have low-write loads, where the write heavy products or services are either served only from one region, and where potential simultaneous updates from multiple regions are ignored.

SUMMARY

Introduced here are a method and system for disaster management in a distributed system. The method includes managing data synchronization among various data storage units in the distributed system and managing recovery of the distributed system from a failure of a data storage unit. The distributed system includes a plurality of computer systems, each computer system having a read-write computer and a data storage unit. Each of the read-write computers acts as a leader and serves a write request from a client by writing the data into corresponding data storage unit. The method includes replicating the data from a particular data storage unit to other data storage units in the distributed system using publish-subscribe model.

The read-write computer receives the replicated data, processes any conflicts in the received replicated data and stores the processed data in the data storage unit. If a particular data storage unit fails, another data storage which has the latest data corresponding to the failed data storage unit is determined and the latest data is replicated to all other data storage units in the distributed system. In this way, the distributed system continues have the data of the failed data storage unit and thus, has recovered from a failure of a data storage unit. Further, when the failed data storage unit is back up, it may be reconstructed using the data from one of the other data storage units in the distributed system that has the replicated data from the failed data storage unit.

Some embodiments of the invention have other aspects, elements, features, and steps in addition to or in place of what is described above. These potential additions and replacements are described throughout the rest of the specification.

BRIEF DESCRIPTION OF THE DRAWINGS

FIGS. 6A, 6B and 6C, collectively, illustrate various conflict resolution scenarios in a distributed system.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed are a method and system for disaster management in distributed system. The method includes managing data synchronization among various data storage units in the distributed system and managing recovery of the distributed system from a failure of a data storage unit. The distributed system includes a plurality of computer systems, each computer system having a read-write computer and a data storage unit. Each of the read-write computers acts as a leader and serves a write request from a client by writing the data into corresponding data storage unit of the computer system. The method includes replicating the data from a particular data storage unit to other data storage units in the distributed system using publish-subscribe model.

The read-write computer of a computer system receives the replicated data, processes any conflicts in the received replicated data and stores the processed data in a data storage unit of the computer system. If a particular data storage unit fails, another data storage which has the latest data corresponding to the failed data storage is determined, and the latest data from the determined data storage unit is replicated to all other data storage units in the distributed system. Thus, the distributed system continues have the data of the failed data storage unit. Further, when the failed data storage unit is back up, it may be reconstructed using the data from one of the other data storage units in the distributed system that has its replicated data.

Figure 1:
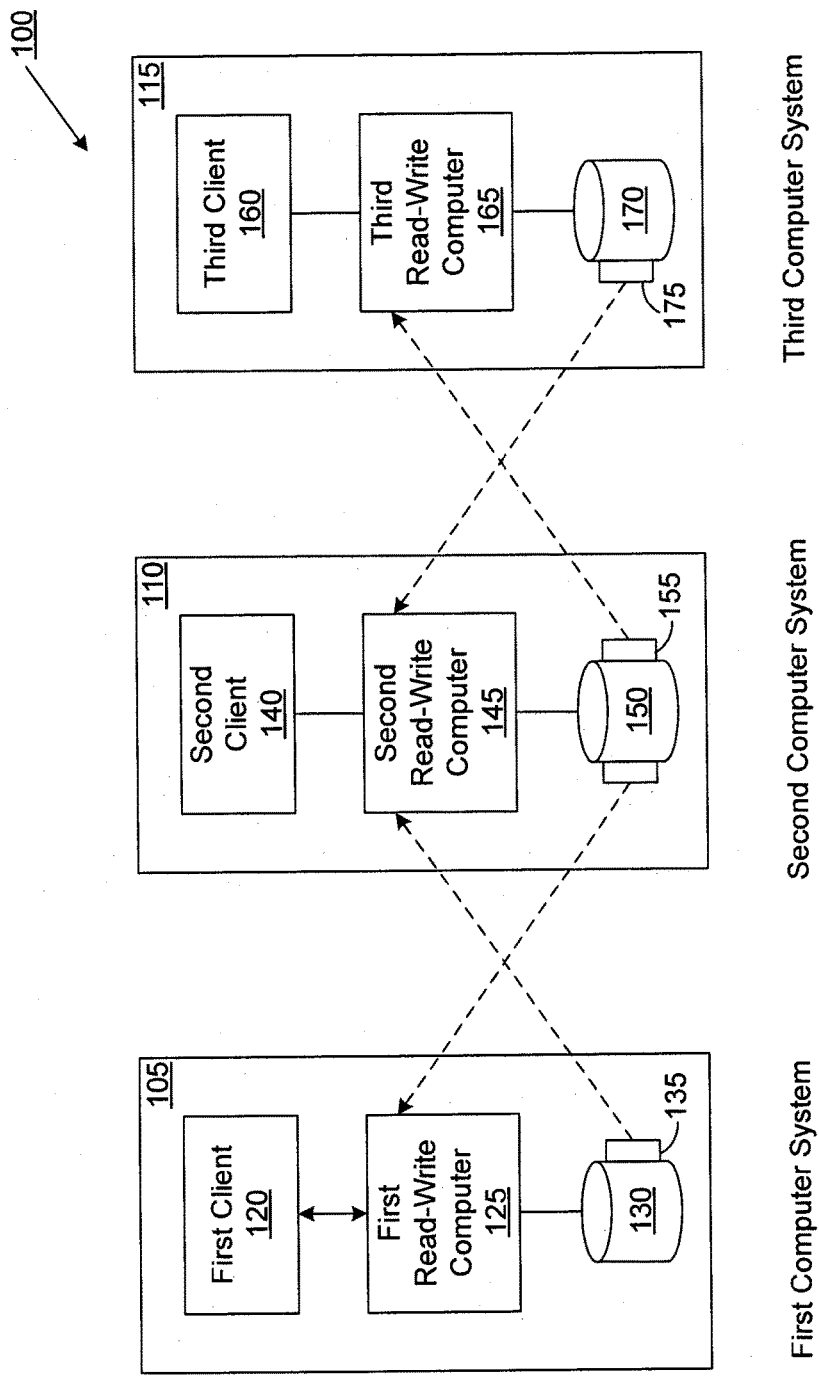
FIG. 1 is a distributed environment in which an embodiment of the invention may operate.

FIG. 1 is a distributed environment in which an embodiment of the invention may operate. The environment includes a distributed system 100 that enables managing a recovery of the distributed system 100 from a failure of a data storage unit. The distributed system 100 includes a plurality of computer systems, such as a first computer system 105, a second computer system 110, and a third computer system 115. Each of the computer systems communicates with other computer systems via a communication network, such as Internet, Local Area Network (LAN), Wide Area Network (WAN), etc.

Each of the computer systems has a read-write computer and a data storage unit. A read-write computer serves read and/or write requests from a client and stores data into the data storage unit. The client can include a web server, an end user processing device, etc. The read-write computer includes a high speed cache memory. The high speed cache memory caches data from the data storage unit. The read-write computer can service a read request from the client by obtaining the data from the high speed cache memory. The write request from the client can be serviced by writing the data into the data storage unit. Further, the read-write computer may also cache the data written to the data storage unit in the high speed cache memory. In an embodiment, the data storage unit can include a database. A data storage unit can be split into a plurality of logical partitions called as shards. A shard contains a subset of the data from the data storage unit.

In an embodiment, each of the computer systems can be installed at different locations. For example, the first computer system 105 can be installed in country A, a second computer system 110 in country B, and a third computer system 115 in country C. Unlike previous distributed system architectures with master slave configuration, all read write computers and data storage units in the distributed system 100 are leaders/masters. That is, all writes in a particular region are forwarded by the read-write computers to the data storage units in that particular region itself. For example, a write request from a second client 140 in the second computer system 110 is forwarded to the second data storage unit 150 itself.

The second data storage unit 150 contains data written by the second client 140 and also replicated data received from other data storage units of the distributed system 100, such as a first data storage unit 130 of the first computer system 105 and a third data storage unit 170 of third computer system 115. To keep the data synchronized among various data storage units in the distributed system 100, data from a particular data storage unit is replicated, by a replication module in the computer system, to other data storage units of the distributed system 100. The data can be replicated using publish-subscribe model. In the publish-subscribe model, data from a particular data storage unit is published to those computer systems that have subscribed to the particular data storage unit. The computer systems may subscribe to data from one or more shards of the data storage unit.

Consider a first example where the second computer system 110 has subscribed to data from the first data storage unit 130 and the third data storage unit 170. The replication module 135 replicates the data from the first computer system 105 to the second computer system 110 by publishing the data from the first data storage unit 130 to the second read-write computer 145 of the second computer system 110. The second read-write computer 145 processes the replicated data and stores the replicated data in the second data storage unit 150. The replication module 175 of the third computer system 115 replicates data from the third data storage unit 170 to the second computer system 110. The data from the second data storage unit 150 may be replicated by the replication module 155 to the first data storage unit 130 and the third data storage unit 170. Accordingly, a data storage unit may be replicated to other data storage units based on the subscriptions for that particular data storage unit. In an embodiment, each of the computer systems in the distributed system 100 may subscribe to data from all other computer systems of the distributed system 100.

Referring back to the first example, when the data is published by the first data storage unit 130 to the second computer system 110, the second read-write computer 145 receives the data, processes the data and writes the data into the second data storage unit 150. The processing of data by the second read-write computer 145 includes resolving any conflicts in the received data. A conflict may arise when, for example, multiple computer systems perform a write on a same data item. The second read-write computer 145 resolves the conflict by choosing one of the copies of the data item based on predefined conflict resolution criteria and writes the data into the second data storage unit 150.

When a data storage unit in a particular computer system fails, the particular computer system can be supported by data storage units of other computer systems in the distributed system 100. One or more of the other computer systems may act as a back-up computer system for the particular computer system. The back-up computer system is selected based on a predefined policy. Further, the back-up computer system could be selected in runtime and can be different for each shard on the failed system. The write requests from the client of the particular computer system are forwarded to data storage units of the back-up computer system. Further, since each of the data storage units is replicated to other subscribed data storage units, the data of the failed data storage unit is available through other data storage units that have subscribed to failed data storage unit. A data storage unit that has the latest data corresponding to the failed data storage unit is determined, and data from that data storage unit is replicated to all other data storage units that have subscribed to the failed data storage unit.

In the publish-subscribe model, data may be published to the subscribed computer systems as and when the data is modified in a data storage unit. However, in some instances, for example, when a load on the publishing data storage unit is high, not all the data may be published to all the subscribed data storage units at the same time. Further, due to certain delays (such as network delay) which can occur in a distributed system, not all the data storage units may receive the data at the same time. Accordingly, data in some of the data storage units may be older than the data in other data storage units.

For example, consider a scenario where the second data storage unit 150 fails, and assume that it failed before publishing latest data, "Version 4," to the subscribed data storage units. Also, assume that, from previous replication, the first data storage unit 130 has "Version 3" of the data from the first data storage unit 130, the third data storage unit 170 has "Version 1" and some other data storage units (not shown) have "Version 2" of the data. Since, the second data storage unit 150 failed before publishing "Version 4," "Version 4" data can be considered as lost with the failure. Accordingly, it is determined that the first data storage unit 130 has the latest data, "Version 3," corresponding to the data from the second data storage unit 150. The "Version 3" data is now replicated from the first data storage unit to all other data storage units that have subscribed to the data from the second data storage unit 150. In an embodiment, if "Version 4" data was published before the failure of the second data storage unit 150, then at least one of the subscribed data storage units would have "Version 4" data and the "Version 4" data may be replicated to all other subscribed data storage units. Accordingly, the data from the second data storage unit 150 is still available in the distributed system 100 even after the second data storage unit 150 failed. Thus, the distributed system 100 has recovered from a failure of the second data storage unit 150.

In an embodiment, when the data is published to the subscribed data storage units, the data is published from each of the shards of the data storage unit. Accordingly, the process for determining which of the subscribed data storage units has the latest data corresponding to the failed data storage unit is performed with respect to each of the shards of the failed data storage unit.

When the second data storage unit 150 has recovered from the failure, it can be reconstructed using one of the subscribed data storage units since the subscribed data storage units have the latest data corresponding to the second data storage unit 150. The second data storage unit 150 can be reconstructed using, for example, a first data storage unit 130. In an embodiment, the reconstruction process depends on a type of the data storage unit. For example, in MySQL database, the reconstruction process involves copying files, such as InnoDB transaction files and bin log files, from the first data storage unit 130. The InnoDB transaction files and bin log files contain various data from the first data storage unit 130.

The reconstruction process can be a time consuming process since huge amounts of data may have to be copied. The amount of data in a distributed system may be in terms of Gigabytes or even Terabytes. After the second data storage unit 150 has caught up with the data from the first data storage unit 130, the replication process is activated and the second data storage unit 150 starts receiving, via the publish-subscribe model, latest data from other data storage units it is subscribed to. Once a replication lag of the second data storage unit 150 is below a predefined threshold, the second data storage unit 150 may be considered as active and be deployed to serve the second computer system 110.

Figure 2:
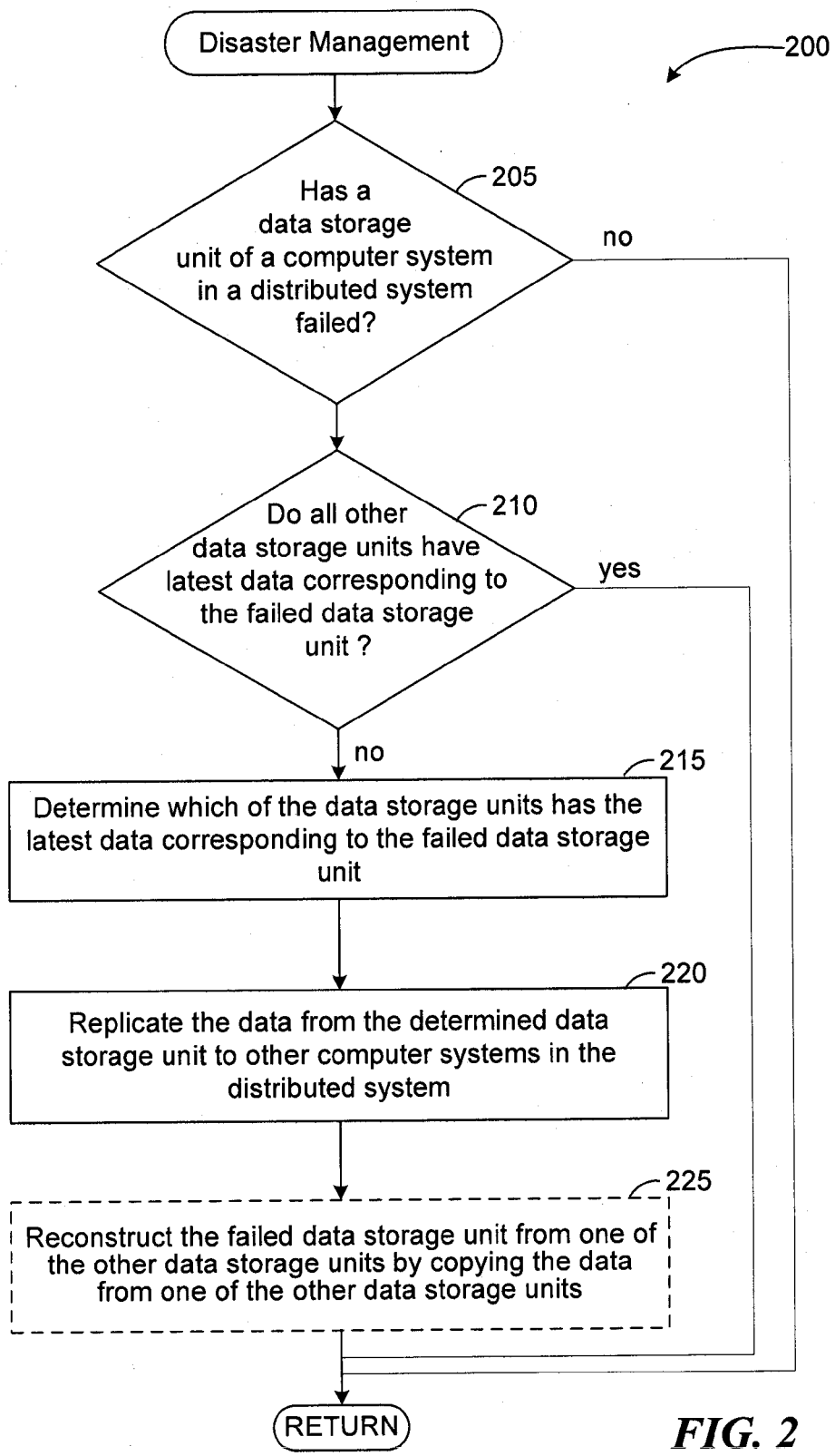
FIG. 2 is a flow diagram illustrating a process for disaster management in a distributed system.

FIG. 2 is a flow diagram illustrating a process 200 for disaster management in a distributed system, according to an embodiment of the disclosed technique. The process 200 may be executed in a distributed system such as distributed system 100 of FIG. 1. At determination step 205, the distributed system 100 determines whether a data storage unit of a computer system has failed. Responsive to a determination that the data storage unit has not failed, the process 200 returns. On the other hand, responsive to a determination that the data storage unit has failed, at determination step 210, the distributed system 100 determines whether other data storage units in the distributed system subscribed to the failed data storage unit has the latest data from the failed data storage unit. Responsive to a determination that all the subscribed data storage units have the latest data corresponding to the failed data storage unit, the process 200 returns.

On the other hand, responsive to a determination that at least some of the subscribed data storage units do not have the latest data corresponding to the failed data storage unit, at step 215, the distributed system 100 determines a subscribed data storage unit that has the latest data corresponding to the failed data storage unit. At step 220, the latest data is replicated from the identified subscribed data storage unit to all other subscribed data storage units. After the data is replicated to all the subscribed data storage units, the distributed system continues, to have the latest data from the failed data storage unit and thus, the distributed system has recovered from the failure of the data storage unit. In an embodiment, the process 200 is performed for each of the shards in the data storage unit.

Additionally, as indicated in step 225, the failed data storage unit may be reconstructed using any of the subscribed data storage units, since they all have the latest data corresponding to the failed data storage unit.

Figure 3:
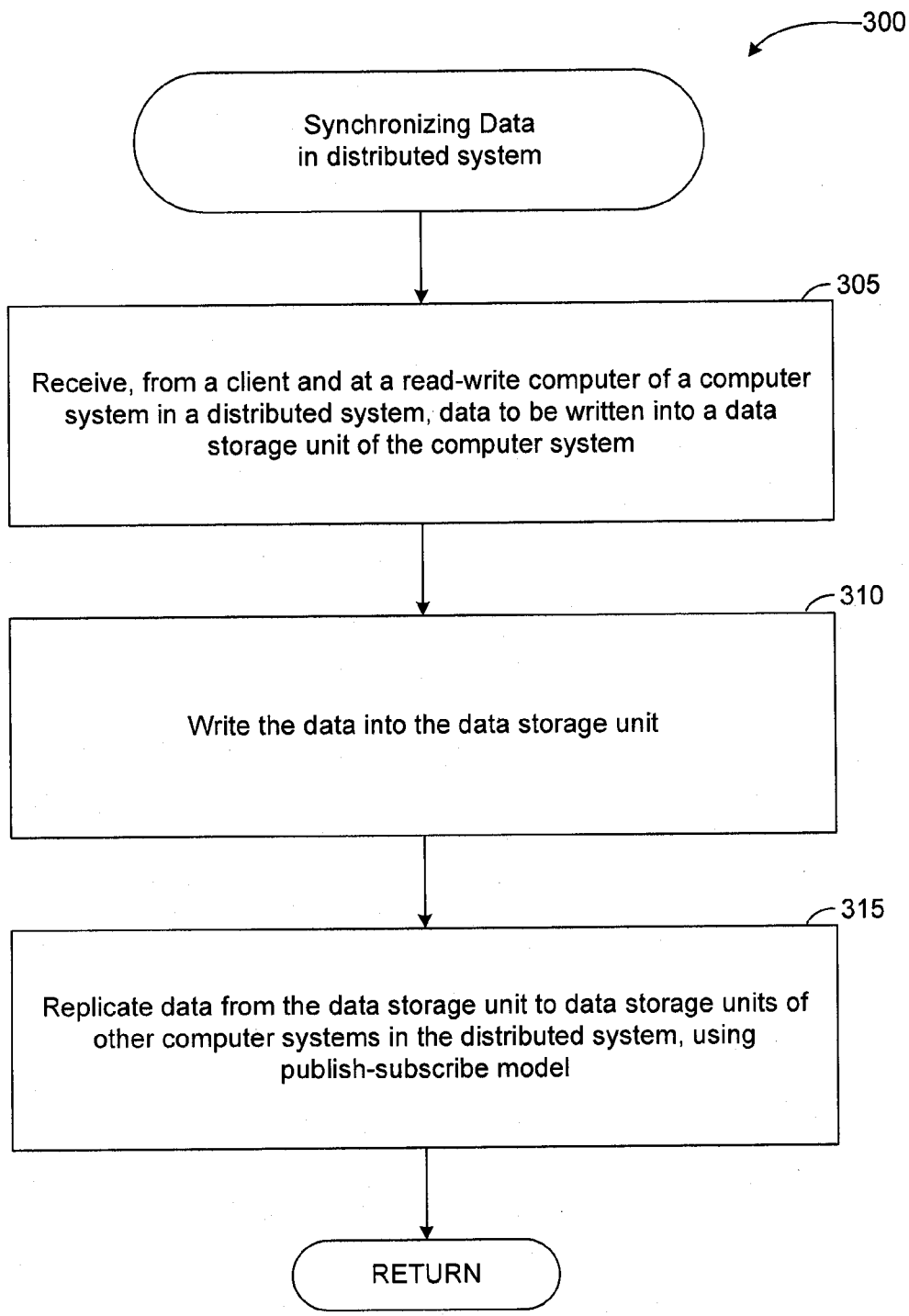
FIG. 3 is a flow diagram illustrating a process for synchronizing data in a distributed system.

FIG. 3 is a flow diagram of a process 300 for synchronizing data in a distributed system, according to an embodiment of the disclosed technique. The process 300 can be executed in a distributed system such as distributed system 100 of FIG. 1. At step 305, a read-write computer of a computer system receives, from a client of the computer system, data to be written into the computer system. The computer system is one of a plurality of computer systems in the distributed system and each of the computer systems includes at least a read-write computer and a data storage unit. In an embodiment, the data to be stored in the data storage unit may not be received from the client directly. While some user actions of the client provide data to be written into the data storage unit, some user actions that do not provide data from the client, may also result in some data being recorded in the computer system. For example, in a social networking environment, a user action such as uploading a picture to social network, commenting on a wall of a user in the social network provide data to be written into the data storage unit. Certain actions such as a user logging into a computer system, which do not provide any data to be written into the data storage unit, may also be recorded in the computer system as a transaction.

At step 310, the read-write computer writes the data into a data storage unit of the computer system. At step 315, the data storage unit replicates the data contained in the data storage unit to other computer systems in the distributed system that have subscribed to the data from the data storage unit. The other subscribed computer systems receive the replicated data from the data storage unit and write them into their corresponding data storage units. The data storage unit publishes the data using publish-subscribe model. In an embodiment, the data may be published to the subscribed computer systems as and when the data is modified in the data storage unit.

Figure 4:
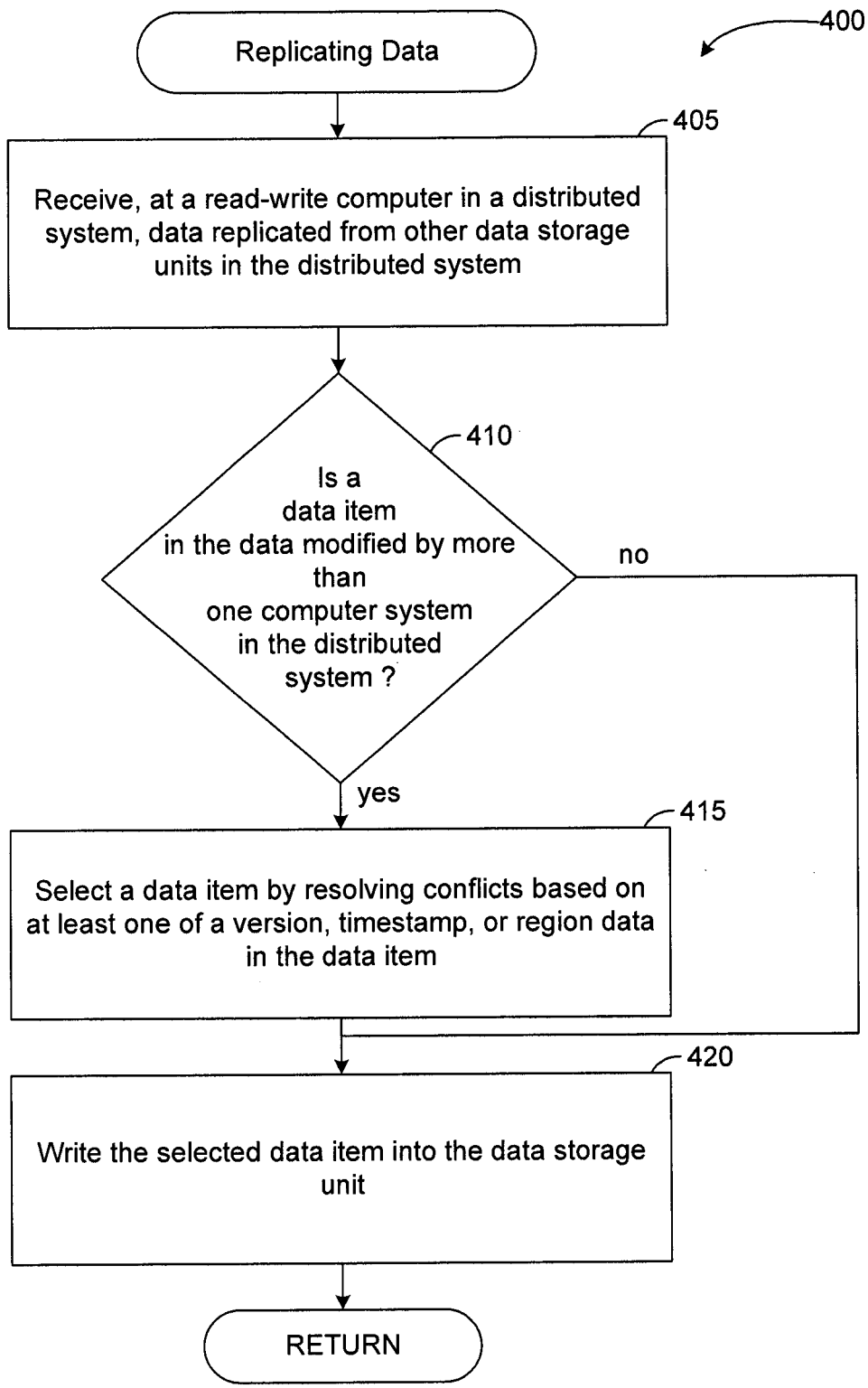
FIG. 4 is a flow diagram illustrating another process for synchronizing data in a distributed system.

FIG. 4 is a flow diagram illustrating a process 400 for synchronizing data in a distributed system, according to an embodiment of the invention. The process 400 may be executed in a system such as distributed system 100 of FIG. 1. At step 405, a read-write computer in a computer system receives replicated data from other data storage units in the distributed system, to which the computer system has subscribed. At determination step 410, the read-write computer determines whether a data item in the replicated data is modified by more than one computer system in the distributed system. Responsive to a determination that a data item in the replicated data has not been modified by more than one computer system, the control is transferred to step 420.

On the other hand, responsive to a determination that a data item in the replicated data has been modified by more than one computer system, at step 415, the read-write computer resolves a conflict between various copies of the data item based on a predefined conflict resolution criteria.

In an embodiment, the pre-defined resolution criteria include selecting a copy of the data item from a particular data storage unit based on at least one of (a) a version of the data item, (b) a timestamp of the data item, or (c) a region of the computer system which modified the data item. At step 420, the read-write computer writes the processed data into a data storage unit of the computer system.

FIGS. 5, 6A, 6B, and 6C, in association with the following paragraphs, describe the conflict resolution process performed by the computer systems while processing the replicated data. In an embodiment, a format of the data item stored in a data storage unit includes (a) a payload, (b) a version of the data item—which is updated every time the data item is modified, (c) a timestamp—time at which the data item was created or modified, and (d) a region of the computer system that created or modified the data item.

Figure 5:
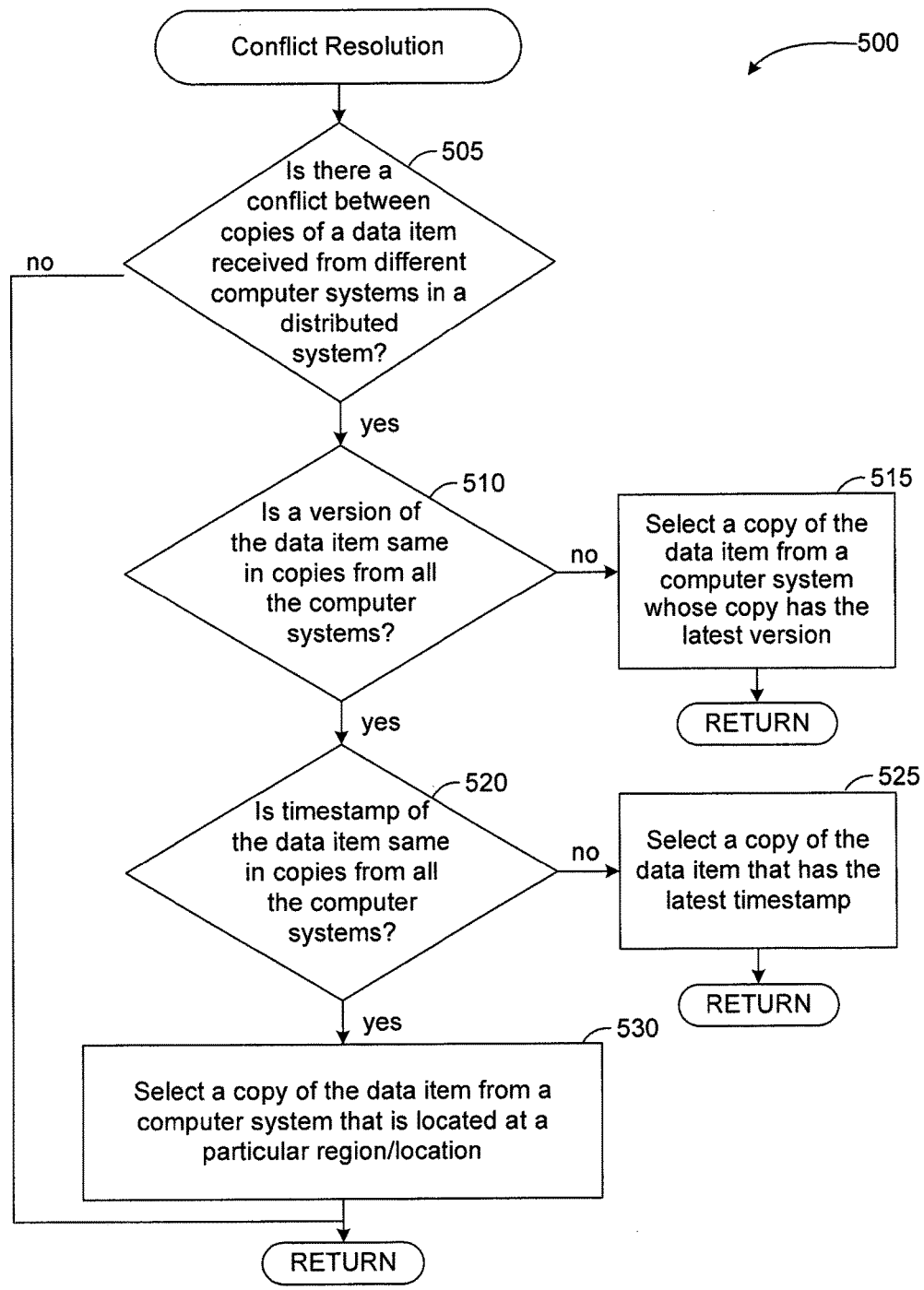
FIG. 5 is a flow diagram illustrating a process of resolving conflicts between duplicate data items in a distributed system based on predefined conflict resolution criteria.

FIG. 5 is a flow diagram illustrating a process 500 of resolving conflicts between duplicate data items in a distributed system based on predefined conflict resolution criteria, according to an embodiment of the disclosed technique. The process 500 may be executed in a distributed system such as distributed system 100 of FIG. 1. In an embodiment, one of the reasons for the data storage unit to publish data to a read-write computer of the subscribed computer system, instead of the data storage unit of the subscribed computer system, is to allow resolving conflicts between duplicate items before storing the data. At determination step 505, a read-write computer of a computer system determines whether a conflict exists in a data item of replicated data it received from the computer systems to which it has subscribed. In an embodiment, a conflict may arise when a data item is modified by more than one computer system in the distributed system. Responsive to a determination that there is no conflict in any of the data items, the process 500 returns.

On the other hand, responsive to a determination that there is a conflict in a data item, at determination step 510, the read-write computer determines whether a version of the data item is same among copies of the data item received from different computer systems. Responsive to a determination that the version of the data item is not same among the copies of the data item, at step 515, the read-write computer selects a copy of the data item which has the highest and/or the latest version.

On the other hand, responsive to a determination that the version of the data item is same among the copies of the data item, at determination step 520, the read-write computer determines whether a timestamp of the data item is same among copies of the data item received from different computer systems. Responsive to a determination that the timestamp of the data item is not same among the copies of the data items, at step 525, the read-write computer selects a copy of the data item which has the latest timestamp.

On the other hand, responsive to a determination that the timestamp is same among the copies of the data item, at step 530, the read-write computer selects a copy of the data item from a computer system in a particular region. The region may be selected based on a predefined policy. For example, if the data item is modified by computer systems in "Region A," "Region B," and "Region C," the data item from "Region A" may be selected over data items from "Region B" and "Region C." After the conflict between copies of the data item is resolved, the read-write computer writes the processed data into a data storage unit of the computer system. Such conflict resolution process is executed at all of the read-write computers in the distributed system.

FIGS. 6A, 6B and 6C illustrate various example conflict resolution scenarios in a distributed system, according to an embodiment of the disclosed technique. The example scenarios may occur in a distributed system such as distributed system 100 of FIG. 1. Assume that the distributed system has a first computer system in region "West," a second computer system in region "Oregon" and a third computer system in region "East" as illustrated in tables of FIGS. 6A, 6B and 6C.

Table 605 in FIG. 6A illustrates a scenario where a copy of the data item wins the conflict resolution based on a version of the data item. Table 610 in FIG. 6B illustrates a scenario where a copy of the data item wins the conflict resolution based on a timestamp of the data item. Table 615 in FIG. 6C illustrates a scenario where a copy of the data item wins the conflict resolution based on a region of the data item.

Figure 7:
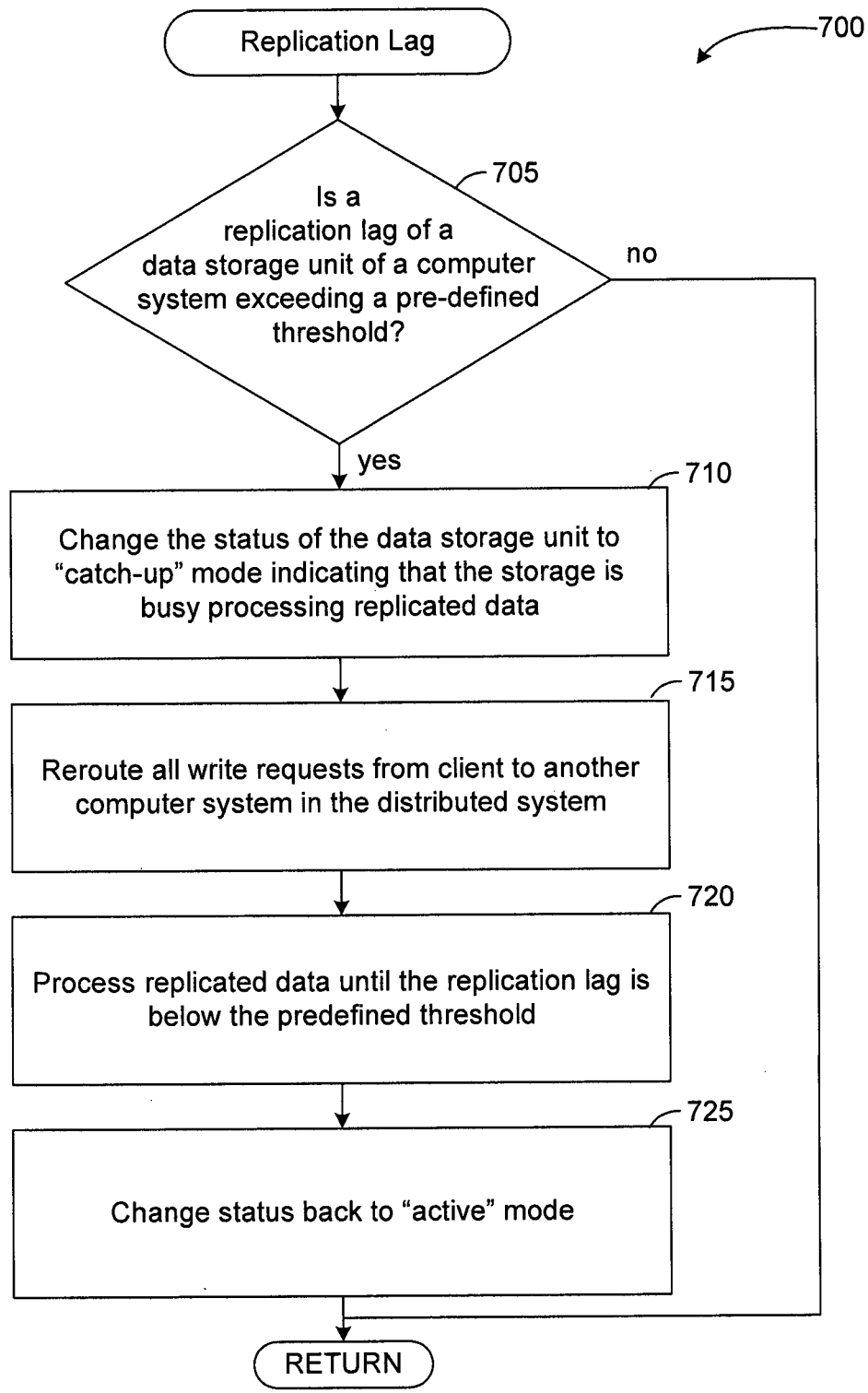
FIG. 7 is a flow diagram illustrating a process of managing a replication lag of a particular data storage unit in a distributed system.

FIG. 7 is a flow diagram illustrating a process 700 of managing a replication lag of a particular data storage unit in a distributed system, according to an embodiment of the disclosed technique. The process 700 may be executed in a distributed system such as distributed system 100 of FIG. 1. A replication lag indicates how far back in time a particular data storage unit is compared to the data storage units it is subscribed to. The replication of data may be a time consuming process. Further, additional delays may be introduced in the process due to factors including network delay, overload of a data storage unit, overload on read-write computers, etc. Accordingly, it may be important for a data storage unit to catch up with rest of the data storage units in the distributed system in order to at least provide the latest data to the users of the distributed system.

At determination step 705, the distributed system determines whether a replication lag of a data storage unit of a computer system exceeds a predefined threshold. In an embodiment, a pre-defined threshold for replication lag can be few milliseconds or seconds. Responsive to a determination that the replication lag of the data storage unit is below the predefined threshold, the process 700 returns. On the other hand, responsive to a determination that the replication lag of the data storage unit exceeds the pre-defined threshold, at step 710, the status of the data storage unit is changed to "catch-up" mode, indicating that the data storage unit is (a) processing replicated data and (b) not accepting writing requests from a client of the computer system.

At step 715, all the write requests from the client of the computer system are routed to other data storage units in the distributed system. The other data storage units, that is, back-up data storage units are selected based on a predefined policy. For example, a back-up data storage unit nearest to the lagged data storage unit or one which has the least load among the data storage units may be selected.

At step 720, the data storage unit processes the replicated data until the replication lag of the data storage unit is below the predefined threshold. At step 725, the status of the data storage unit is changed from "catch-up" mode back to "active" mode, indicating that the data storage is active and accepting write requests.

In an embodiment, a replication lag is computed for each of the shards in the data storage unit with respect to the different subscribed computer systems. The maximum of these replication lags is the replication lag for that shard in the data storage unit. For example, if a replication lag of shard 1 in region "West" with respect to subscribed data storage unit in region "East" is 10 seconds, with respect to region "Oregon" is 20 seconds and with respect to "Timbuktu" is 5 seconds, the global replication lag of shard 1 in region "West" may be determined as a max (10, 20, 5)=20 seconds. The replication lag may be determined for each of the shards in the data storage unit similarly.

Figure 8:
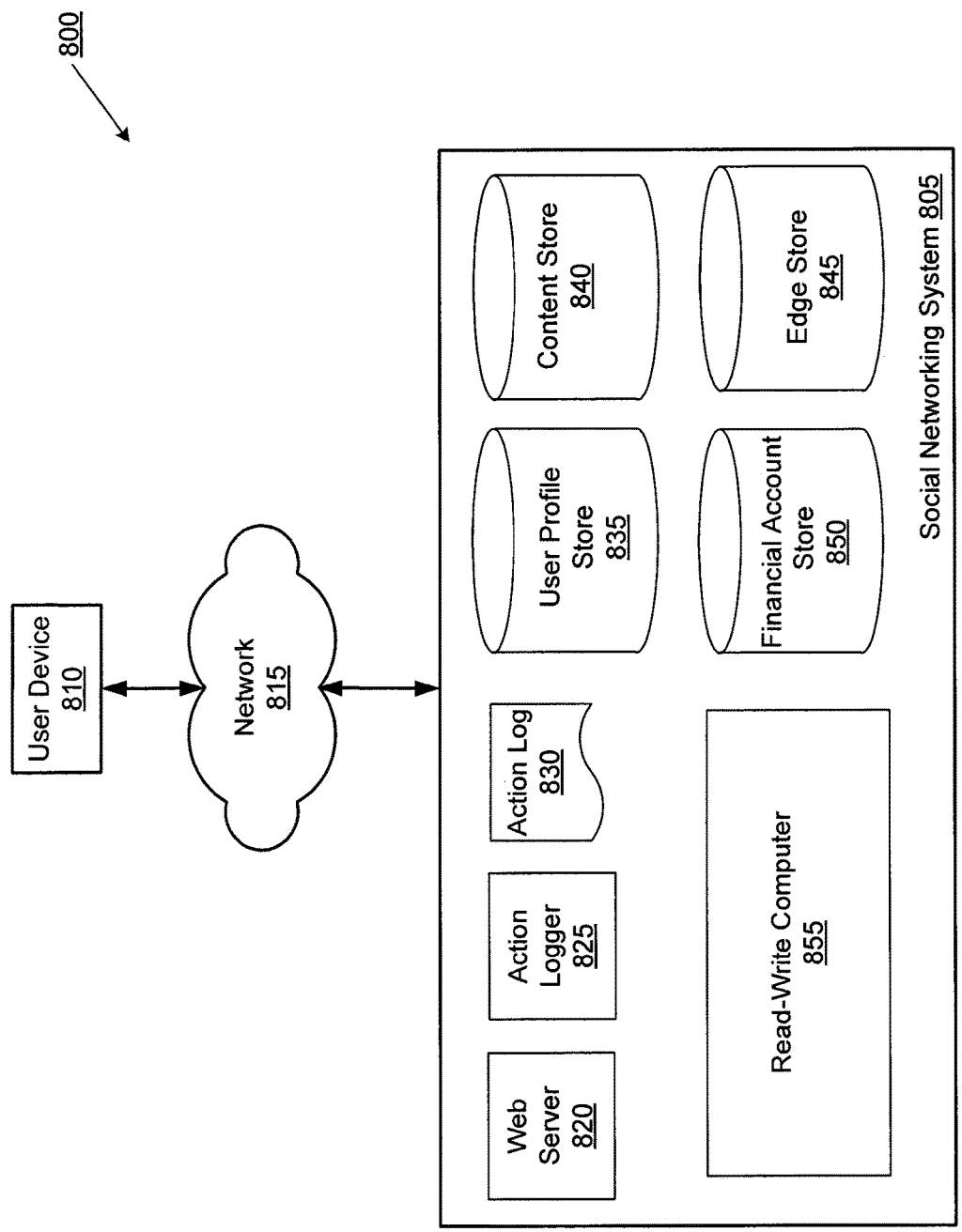
FIG. 8 is an environment including a social networking system in which an embodiment of the disclosed technique may operate.

FIG. 8 is an environment including a social networking system 805 with which some embodiments of the present invention may be utilized. Each of the computer systems of FIG. 1 could be implemented in the environment 800. The system environment 800 includes a social networking system 805, a user device 810 and a network 815. In other embodiments, the system environment 800 may include different and/or additional components than those shown by FIG. 1.

The social networking system 805 comprises one or more computing devices storing user profiles associated with users and/or other objects as well as connections between users and other users and/or objects. In use, users join the social networking system 805 and then add connections to other users or objects of the social networking system to which they desire to be connected. As further described below, users of the social networking system 805 may be individuals or entities such as businesses, organizations, universities, manufacturers. The social networking system 805 allows its users to interact with each other as well as with other objects maintained by the social networking system 805. In some embodiments, the social networking system 805 allows users to interact with third-party websites and financial account providers.

Based on stored data about users, objects and connections between users and/or objects, the social networking system 805 generates and maintains a "social graph." comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 805 modifies edges connecting the various nodes to reflect the interactions.

A user device 810 is a computing device capable of receiving user input as well as transmitting and/or receiving data via the network 815. In one embodiment, the user device 810 is a conventional computer system, such as a desktop or laptop computer. In another embodiment, the user device 810 may be a device having computer functionality, such as a personal digital assistant (PDA), mobile telephone, smart-phone or similar device. The user device 810 is configured to communicate with the social networking system 805, and/or the financial account provider via the network 815. In one embodiment, the user device 810 executes an application allowing a user of the user device 810 to interact with the social networking system 805. For example, the user device 810 executes a browser application to enable interaction between the user device 810 and the social networking system 805 via the network 815. In another embodiment, a user device 810 interacts with the social networking system 805 through an application programming interface (API) that runs on the native operating system of the user device 810, such as IOS® or ANDROID™.

The user device 810 are configured to communicate via the network 815, which may comprise any combination of local area and/or wide area networks, using both wired and wireless communication systems. In one embodiment, the network 815 uses standard communications technologies and/or protocols. Thus, the network 815 may include links using technologies such as Ethernet, 802.11, worldwide interoperability for microwave access (WiMAX), 3G, 4G, CDMA, digital subscriber line (DSL), etc. Similarly, the networking protocols used on the network 815 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 815 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The social networking system 805 includes a web server 820, an action logger 825, an action log 830, a user profile store 835, a content store 840, an edge store 845, a financial account store 850, and a read-write computer system 855. In other embodiments, the social networking system 805 may include additional, fewer, or different modules for various applications. Conventional components such as network interfaces, security mechanisms, load balancers, failover servers, management and network operations consoles, and the like are not shown so as to not obscure the details of the system architecture.

Web server 820 links social networking system 805 via network 815 to one or more user devices 810; the web server 820 serves web pages, as well as other web-related content, such as Java, Flash, XML, and so forth.

Each user of the social networking system 805 is associated with a user profile, which is stored in the user profile store 835. A user profile includes declarative information about the user that was explicitly shared by the user, and may also include profile information inferred by the social networking system 805. In one embodiment, a user profile includes multiple data fields, each data field describing one or more attributes of the corresponding user of the social networking system 805. The user profile information stored in user profile store 835 describes the users of the social networking system 805, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 805 displayed in an image. A user profile in the user profile store 835 may also maintain references to actions by the corresponding user performed on content items in the content store 840 and stored in the edge store 845.

A user profile may be associated with one or more financial accounts, allowing the user profile to include data retrieved from or derived from a financial account. A user may specify one or more privacy settings, which are stored in the user profile, that limit information from a financial account that the social networking system 805 is permitted to access. For example, a privacy setting limits the social networking system 805 to accessing the transaction history of the financial account and not the current account balance.

As another example, a privacy setting limits the social networking system 805 to a subset of the transaction history of the financial account, allowing the social networking system 805 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 805. In one embodiment, information from the financial account is stored in the user profile store 835. In other embodiments, it may be stored in the financial account store 850.

The content store 840 stores content items associated with a user profile, such as images, videos or audio files. Content items from the content store 840 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 805. Examples of social networking content items include suggested connections or suggestions to perform other actions, media provided to, or maintained by, the social networking system 805 (e.g., pictures or videos), status messages or links posted by users to the social networking system, events, groups, pages (e.g., representing an organization or commercial entity), and any other content provided by, or accessible via, the social networking system.

The content store 840 also includes one or more pages associated with entities having user profiles in the user profile store 835. An entity is a non-individual user of the social networking system 805, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 840, allowing social networking system users to more easily interact with the vendor via the social networking system 805. A vendor identifier is associated with a vendor's page, allowing the social networking system 805 to identify the vendor and/or to retrieve additional information about the vendor from the user profile store 835, the action log 830 or from any other suitable source using the vendor identifier. In some embodiments, the content store 840 may also store one or more targeting criteria associated with stored objects and identifying one or more characteristics of a user to which the object is eligible to be presented.

The action logger 825 receives communications about user actions on and/or off the social networking system 805, populating the action log 830 with information about user actions. Such actions may include, for example, adding a connection to another user, sending a message to another user, uploading an image, reading a message from another user, viewing content associated with another user, attending an event posted by another user, among others. In some embodiments, the action logger 825 receives, subject to one or more privacy settings, transaction information from a financial account associated with a user and identifies user actions from the transaction information. For example, the action logger 825 retrieves vendor identifiers from the financial account's transaction history and identifies an object, such as a page, in the social networking system associated with the vendor identifier. This allows the action logger 825 to identify a user's purchases of products or services that are associated with a page, or another object, in the content store 840. In addition, a number of actions described in connection with other objects are directed at particular users, so these actions are associated with those users as well. These actions are stored in the action log 830.

The action log 830 may be used by the social networking system 805 to track user actions on the social networking system 805, as well as external website that communicate information to the social networking system 805. Users may interact with various objects on the social networking system 805, including commenting on posts, sharing links, and checking-in to physical locations via a mobile device, accessing content items in a sequence or other interactions. Information describing these actions is stored in the action log 830. Additional examples of interactions with objects on the social networking system 805 included in the action log 830 include commenting on a photo album, communications between users, becoming a fan of a musician, adding an event to a calendar, joining a groups, becoming a fan of a brand page, creating an event, authorizing an application, using an application and engaging in a transaction. Additionally, the action log 830 records a user's interactions with advertisements on the social networking system 805 as well as other applications operating on the social networking system 805. In some embodiments, data from the action log 830 is used to infer interests or preferences of the user, augmenting the interests included in the user profile and allowing a more complete understanding of user preferences.

The action log 830 may also store user actions taken on external websites and/or determined from a financial account associated with the user. For example, an e-commerce website that primarily sells sporting equipment at bargain prices may recognize a user of a social networking system 805 through social plug-ins that enable the e-commerce website to identify the user of the social networking system 805. Because users of the social networking system 805 are uniquely identifiable, e-commerce websites, such as this sporting equipment retailer, may use the information about these users as they visit their websites. The action log 830 records data about these users, including webpage viewing histories, advertisements that were engaged, purchases made, and other patterns from shopping and buying. Actions identified by the action logger 825 from the transaction history of a financial account associated with the user allow the action log 830 to record further information about additional types of user actions.

In one embodiment, an edge store 845 stores the information describing connections between users and other objects on the social networking system 805 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 805, such as expressing interest in a page on the social networking system, sharing a link with other users of the social networking system, and commenting on posts made by other users of the social networking system. The edge store 845 stores edge objects that include information about the edge, such as affinity scores for objects, interests, and other users. Affinity scores may be computed by the social networking system 805 over time to approximate a user's affinity for an object, interest, and other users in the social networking system 805 based on the actions performed by the user. Multiple interactions between a user and a specific object may be stored in one edge object in the edge store 845, in one embodiment. In some embodiments, connections between users may be stored in the user profile store 835, or the user profile store 835 may access the edge store 845 to determine connections between users.

The read-write computer 855 serves read and/or write requests from a client including the user device 810 and other components of the social networking system 805. The read-write computer 855 includes a high speed cache memory (not shown). The high speed cache memory caches data from any or all of the above described storage units or logs of the social networking system 805. The read-write computer 855 can service a read request from the client by obtaining the data from the high speed cache memory. The write request from the client can be serviced by writing the data into any or all of the storage units. Further, the read-write computer 855 may also cache the data written to the storage units in the high speed cache memory.

Figure 9:
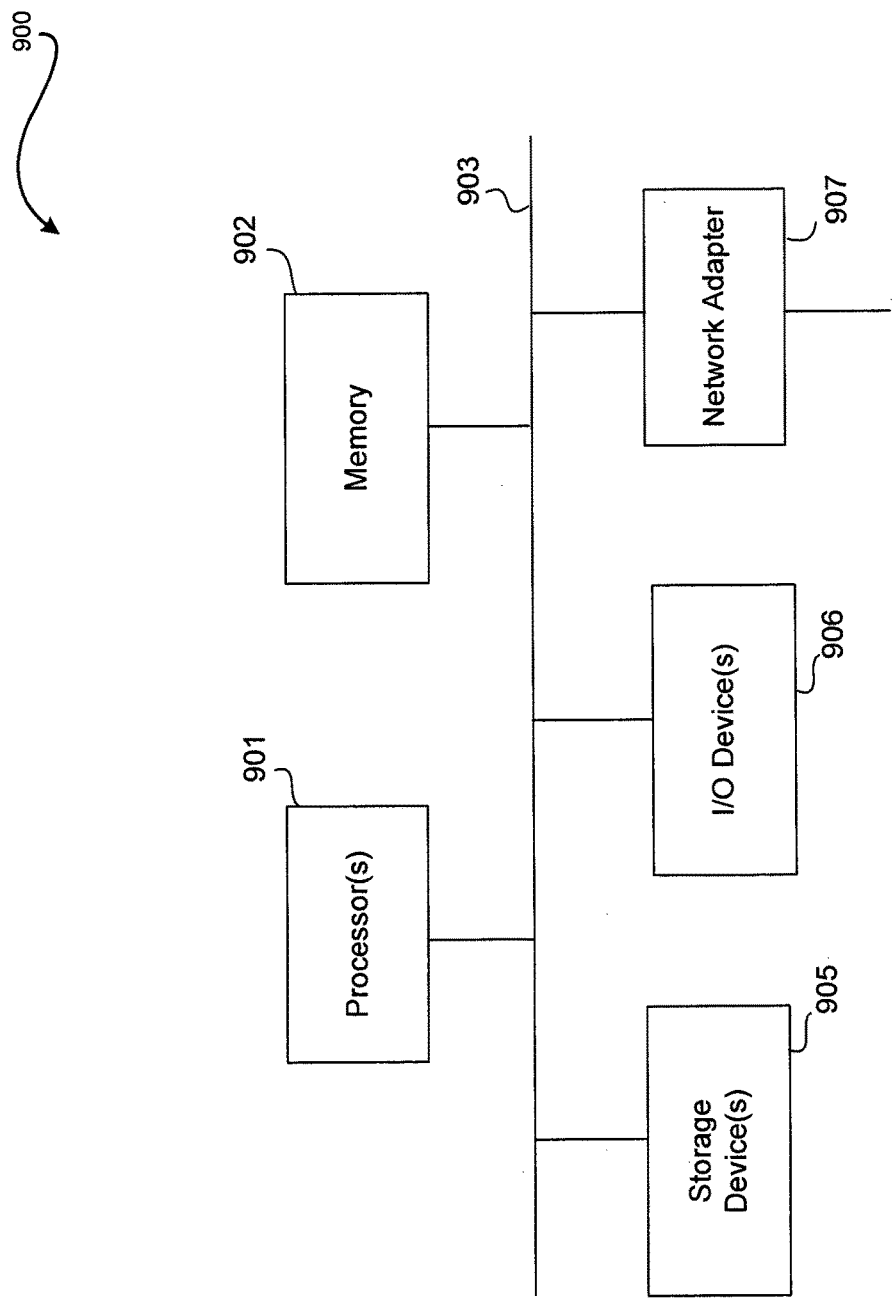
FIG. 9 is a block diagram of an apparatus that may perform various operations, and store various information generated and/or used by such operations.

FIG. 9 is a block diagram of an apparatus that may perform various operations, and store various information generated and/or used by such operations, according to an embodiment of the disclosed technique. The apparatus can represent any computer or processing system described herein. The processing system 900 is a hardware device on which any of the entities, components or services depicted in the examples of FIGS. 1-8 (and any other components described in this specification) can be implemented, such as a server, client, storage devices, databases, data storage units, read-write computers, high speed cache, etc. The processing system 900 includes one or more processors 901 and memory 902 coupled to an interconnect 903. The interconnect 903 is shown in FIG. 9 as an abstraction that represents any one or more separate physical buses, point to point connections, or both connected by appropriate bridges, adapters, or controllers. The interconnect 903, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 901 is/are the central processing unit (CPU) of the processing system 900 and, thus, control the overall operation of the processing system 900. In certain embodiments, the processor(s) 901 accomplish this by executing software or firmware stored in memory 902. The processor(s) 901 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 902 is or includes the main memory of the processing system 900. The memory 902 represents any form of random access memory (RAM), read-only memory (ROM), flash memory, or the like, or a combination of such devices. In use, the memory 902 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 901 through the interconnect 903 are a network adapter 907, a storage device(s) 905 and I/O device(s) 906. The network adapter 907 provides the processing system 900 with the ability to communicate with remote devices, over a network and may be, for example, an Ethernet adapter or Fibre Channel adapter. The network adapter 907 may also provide the processing system 900 with the ability to communicate with other computers within the cluster. In some embodiments, the processing system 900 may use more than one network adapter to deal with the communications within and outside of the cluster separately.

The I/O device(s) 906 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 902 can be implemented as software and/or firmware to program the processor(s) 901 to carry out actions described above. In certain embodiments, such software or firmware may be initially provided to the processing system 900 by downloading it from a remote system through the processing system 900 (e.g., via network adapter 907).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 905 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method comprising:

receiving, from a client and at a first read-write computer of a first computer system in a distributed system having a plurality of computer systems, data to be written into the first computer system, each of the computer systems including at least a read-write computer and a data storage unit;

writing the data into a first logical partition of a first data storage unit of the first computer system, the first logical partition being one or multiple logical partitions of the first data storage unit;

replicating the data from the first data storage unit to multiple data storage units in the distributed system, the replicating including:

identifying a first set of the computer systems that has subscribed to the first logical partition, the logical partitions including a second logical partition to which a second set of the computer systems has subscribed, the first set being different from the second set, transmitting, via a publish-subscribe model, the data from the first data storage unit to multiple read-write computers of the first set of the computer systems, and writing, by the read-write computers, the data to the corresponding data storage units;

determining whether the first data storage unit has failed;

responsive to a determination that the first data storage unit has failed, selecting one of multiple back-up computer systems for processing a write request received at the first computer system, wherein the backup computer systems are different for different logical partitions of the first data storage unit;

in response to a determination that the first data storage unit has recovered from a failure:

identifying a specified computer system that has a latest version of a specified data associated with the first data storage unit among a subset of the plurality of computer systems that has subscribed to the first data storage unit, reconstructing the specified data by replicating the latest version of the specified data from the specified computer system to the first data storage unit, and receiving, at the first data storage unit, subscribed data from another subset of the plurality of computer systems to which the first data storage unit has subscribed, wherein receiving the subscribed data is performed after reconstructing the specified data; and determining whether a replication lace of the first data storage unit with respect to other data storage units of the computer system exceeds a predefined threshold; and responsive to a determination that the replication lag of the first data storage unit exceeds a predefined threshold, changing the status of the first data storage unit to a catch up mode, indicating that the first data storage unit is (a) processing replicated data from other data storage units and (b) not accepting write requests from the client routing, by the first read-write computer, all write requests from the client to a second data storage unit of a second computer system in the distributed system, allowing the first data storage unit to process the replicated data from other data storage units until the replication lag is below the predefined threshold, and changing the status of the first data storage unit from the catch upmode to active mode, indicating that the first data storage unit is ready to accept write requests from the client.

2. The method of claim 1, wherein the read-write computer of a computer system serves at least one of (a) a read request or (b) a write request, from the client.

3. The method of claim 1, wherein the read-write computer of a computer system includes a cache memory.

4. The method of claim 1, wherein the first read-write computer caches data from the first data storage unit in a cache memory.

5. The method of claim 4, wherein the first read-write computer serves a read request from the client by obtaining data from the cache memory.

6. The method of claim 1, wherein the one of back-up computer systems is selected based on a predefined policy.

7. The method of claim 1, wherein replicating the data from the first data storage unit to data storage units of other computer systems includes:

receiving, at the first read-write computer and via the publish-subscribe model, replicated data from data storage units of other computer systems to which the first read-write computer has subscribed, determining whether a data item in the replicated data has been modified by more than one computer system in the distributed system, responsive to a determination that the data item has been modified by more than one computer system, resolving a conflict between copies of the data item from different computer systems based on a predefined criteria, and writing the replicated data into the first data storage unit.

8. The method of claim 7, wherein each of the data items in the replicated data has a format that includes at least (a) payload, (b) a timestamp of creation or modification of a data item, (c) a version of the data item, and (d) a region of a computer system from which the data item is replicated.

9. The method of claim 8, wherein the version and the timestamp are updated each time the payload of the data item is modified.

10. The method of claim 7, wherein the predefined criteria for resolving the conflicts include:

selecting a copy of the data item, from a particular computer system, that has a latest version among the copies from the different computer systems, if the version is the same among the copies of the data item, selecting a copy of the data item, from a particular computer system, that has a latest timestamp among the copies from the different computer systems, and if the timestamp is the same among the copies of the data item, selecting a copy of the data item from a computer system of a particular region based on a predefined policy.

11. The method of claim 1, wherein the data storage unit of each of the computer systems is split into a plurality of logical partitions, each of the logical partitions including a subset of data from the data storage unit.

12. The method of claim 11, wherein replicating the data from the first data storage unit to data storage units of the other computer systems includes:

transmitting, via the publish-subscribe model, the data from each of the logical partitions of the first data storage unit.

13. The method of claim 12, wherein transmitting the data via the publish-subscribe model includes:
publishing, by the first data storage unit, the data from each of the logical partitions to other computer systems that have subscribed to the data of a particular logical partition in the first data storage unit.

14. A method comprising:
determining whether a first data storage unit of a first computer system in a distributed system has failed, wherein the first computer system is one of a plurality of computer systems in the distributed system, and wherein each of the computer systems includes at least a read-write computer and a data storage unit;
responsive to a determination that the first data storage unit has failed, determining if data from the first data storage unit is replicated to other computer systems in the distributed system that have subscribed to the data from the first computer system, the determining further including:
selecting one of multiple back-up computer systems for processing a write request received at the first computer system, wherein the backup computer systems are different for different logical partitions of the first data storage unit;
responsive to a determination that the data from the first data storage unit is not replicated to the other computer systems, identifying a particular data storage unit in the distributed system that has a latest version of data corresponding to the first data storage unit;
replicating, via a publish-subscribe model, the latest version of data from the particular data storage unit to a first set of computer systems, the replicating including:
identifying the first set of computer systems that has subscribed to a first logical partition of the multiple logical partitions of the first data storage unit storing the data, the logical partitions including a second logical partition to which a second set of the computer systems has subscribed, the first set being different from the second set; and
in response to a determination that the first data storage unit has recovered from a failure:
reconstructing the data by replicating the latest version of the data from the particular data storage unit to the first data storage unit, and
receiving, at the first data storage unit, subscribed data from a subset of the plurality of computer systems to which the first data storage unit has subscribed, wherein receiving the subscribed data is performed after reconstructing the data; and
determining whether a replication lag of the first data storage unit with respect to other data storage units of the computer system exceeds a predefined threshold; and
responsive to a determination that the replication lag of the first data storage unit exceeds a predefined threshold,
changing the status of the first data storage unit to a catch up mode, indicating that the first data storage unit is (a) processing replicated data from other data storage units and (b) not accepting write requests from the client
routing, by the first read-write computer, all write requests from the client to a second data storage unit of a second computer system in the distributed system,
allowing the first data storage unit to process the replicated data from other data storage units until the replication lag is below the predefined threshold, and
changing the status of the first data storage unit from the catch up mode to active mode, indicating that the first data storage unit is ready to accept write requests from the client.

15. The method of claim 14, wherein replicating the latest version of data from the particular data storage unit to the first set of the computer systems includes:
transmitting the latest version of data from the particular data storage unit to multiple read-write computers of the first set of the computer systems, and
writing, by the read-write computers, the latest data into corresponding data storage units of the first set of the computer systems.

16. The method of claim 15 further comprising:
reconstructing the first data storage unit by copying data from a source data storage unit of one of the first set of the computer systems to the first data storage unit.

17. The method of claim 16, wherein copying the data from the source data storage unit includes:
copying at least transaction files and bin log files from the source data storage unit, and
replicating, via the publish-subscribe model, data from the source data storage unit to the first computer system, to obtain the data that is not included in the transaction files and bin log files.

18. An apparatus comprising:
a distributed system having a plurality of computer systems, each of the computer systems having at least:
a read-write computer to serve a read request and/or a write request from a client,
a data storage unit to store data forwarded from the read-write computer, and
a replication module to replicate, via a publish-subscribe model, the data stored in the data storage unit of a computer system to multiple data storage units of a first set of the computer systems, wherein the first set of the computer systems are computer systems that have subscribed to data stored in a logical partition of multiple logical partitions of the data storage unit, the logical partitions including a second logical partition to which a second set of the computer systems has subscribed, the first set being different from the second set, and wherein the replication module transmits the data from the data storage unit to multiple read-write computers of the first set of the computer systems, wherein the distributed system is further configured to:
determine whether the data storage unit has failed, and
responsive to a determination that the data storage unit has failed,
selecting one of multiple back-up computer systems for processing a write request, wherein the backup computer systems are different for different logical partitions of the data storage unit,
identifying one of the first set of computer systems that has a latest version of data associated with the logical partition, and
replicating the latest version of data from the one of the first set of computer systems to a remaining of the first set of computer systems;
in response to a determination that the data storage unit has recovered from a failure:
reconstructing the data associated with the logical partition by replicating the latest version of the data from the one of the first set of computer systems to the data storage unit, and receiving, at the data storage unit, subscribed data from a subset of the plurality of computer systems to which the data storage unit has subscribed, wherein receiving the subscribed data is performed after reconstructing the data; and determine whether a replication lag of the data storage unit with respect to other data storage units of the computer systems exceeds a predefined threshold; and responsive to a determination that the replication lag of the data storage unit exceeds a predefined threshold, changing the status of the data storage unit to a catch up mode, indicating that the data storage unit is (a) processing replicated data from other data storage units and (b) not accepting write requests from the client, routing, by the read-write computer, all write requests from the client to a second data storage unit of a second computer system in the distributed system, allowing the data storage unit to process the replicated data from other data storage units until the replication lag is below the predefined threshold, and changing the status of the data storage unit from the catch up mode to active mode, indicating that the data storage unit is ready to accept write requests from the client.

* * * * *